Figure 1:
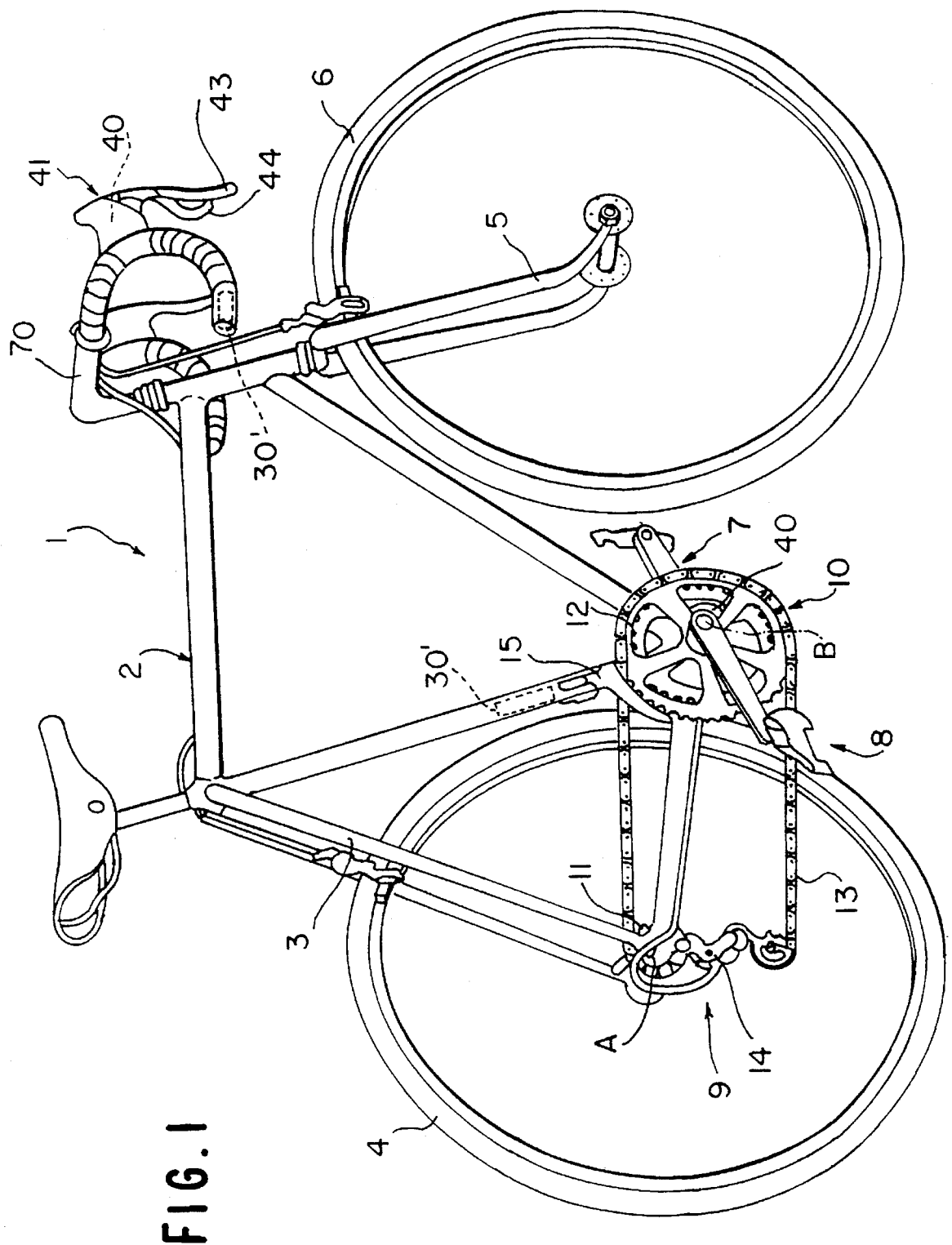

United States Patent [19]
Campagnolo

[11] Patent Number: 5,480,356
[45] Date of Patent: Jan. 2, 1996

[54] SPEED CHANGE DEVICE FOR BICYCLES

[75] Inventor: Valentino Campagnolo, Vicenza, Italy

[73] Assignee: Campagnolo S.r.l., Vicenza, Italy

[21] Appl. No.: 364,459

[22] Filed: Dec. 27, 1994

[30] Foreign Application Priority Data

Feb. 24, 1994 [IT] Italy .................................. TO93A0116

[51] Int. Cl.⁶ .............................. F16H 9/24; F16H 59/00
[52] U.S. Cl. .............................. 474/70; 474/80; 474/103; 474/110; 474/116; 280/238
[58] Field of Search ................................. 474/70, 80, 82, 474/103, 110, 116; 280/238

[56] References Cited

U.S. PATENT DOCUMENTS

| | | | |
|---|---|---|---|
| 4,946,425 | 8/1990 | Buhlmann | 474/80 |
| 4,952,196 | 8/1990 | Chilcote et al. | 474/70 |
| 5,059,158 | 10/1991 | Bellio et al. | 474/70 |
| 5,356,348 | 10/1994 | Bellio et al. | 474/80 X |
| 5,358,451 | 10/1994 | Lacombe et al. | 474/80 X |

FOREIGN PATENT DOCUMENTS

| | | |
|---|---|---|
| 529664 | 3/1993 | European Pat. Off. . |
| 3938454 | 5/1991 | Germany . |

Primary Examiner—Roger J. Schoeppel
Attorney, Agent, or Firm—Sughrue, Mion, Zinn, Macpeak & Seas

[57] ABSTRACT

A powered control device for speed change in a bicycle comprises an electric motor directly mounted onto the rear derailleur and is provided with an encoder for detecting the position of the rear derailleur.

7 Claims, 3 Drawing Sheets

SPEED CHANGE DEVICE FOR BICYCLES

The present invention relates to a speed change device for bicycles, comprising:

- at least one rear derailleur having a first body to be fixed to a bicycle frame and a second body carrying idle wheels for a bicycle chain, said second body being displaceable with respect to said first body into a plurality of positions to cause selective engagement of the chain with a plurality of sprockets carried by the hub of the rear wheel of the bicycle, in order to provide the various gear ratios of the speed change device,
- a d.c. electric motor for driving the movement of said second body of the derailleur,
- electronic control means for controlling said electric motor,
- manually controlled actuating means connected to said electronic control means to cause actuation of the electric motor in order to engage a desired gear ratio,
- electronic means for detecting the position of said second body of the derailleur and for signalling said position to said control means to enable the electric motor to be automatically deactivated when the desired gear ratio is reached.

A speed change device of the above indicated type is disclosed in European Patent Application EP-A-529 664. In this known device, the electric motor actuates the rear derailleur by means of a flexible cable. A similar actuating system is also provided for the front derailleur, which also uses an electric motor connected to the front derailleur through a flexible cable. The two electric motors are provided with means for connection to the bicycle frame.

This arrangement has various drawbacks: firstly the installation of the unit, and in particular of the powered actuators for the rear and front derailleurs requires relatively time-consuming and delicate operations, particularly in connection with the adjustment of the respective flexible cable controls.

Secondly, since the two derailleur of the unit have a conventional structure, i.e. including respective return springs, the power required for displacement thereof is relatively high, which requires the use of motors and associated supply batteries having a relatively bulk and hence relatively heavy size.

Finally, the size of the motors and the battery, as well as their positioning on the bicycle frame, involve bulky and disturbing projections.

The above mentioned drawbacks are particularly critical in the case of application of these known device to race bicycles, which require simple and rapid adjustment operations and, above all, weights and dimensions as much reduced as possible.

From German Patent Application DE-A-39 38 454 there is also known a powered device for driving the change of a bicycle, which partially solves the problem connected to the bulk of the motor, due to that the powered actuator is directly mounted on the rear derailleur. Although in this manner it is possible to eliminate the conventional return spring of the derailleur, and hence the corresponding reaction force, the actuating system which is provided therein is of electrical-hydraulical type, which involves the use of auxiliary apparatus and consequently complications in construction as well as weighs and bulks even greater than those of the known solution described above. Furthermore, this arrangement involves problems in the precision of the system detecting the movement of the derailleur, which also is constructed so as to be bulky and difficult to be mounted and adjusted.

The applicant as already proposed a powered speed change unit for bicycles in its previous Italian application No. TO93A000503 filed on 8 Jul. 1993 and still secret at the priority date of the present application. The above identified Italian application also correspond to U.S. application Ser. No. 08/257148 filed on 9 Jun. 1994. In this solution, the electric motor is mounted directly onto the rear derailleur, whereas the detecting means includes a transducer device located at a remote position with respect to the derailleur and having a movable element and a transmission member which interconnects said movable member of the transducer device to the derailleur. This solution has demonstrated to be superior to the known solutions which have been described above, but at the same time has the drawback of involving mounting and adjustment operations which are not always easy.

In order to overcome all the drawbacks of the above described solutions, the present invention provides a speed change device for bicycles, comprising:

- al least one rear derailleur having a first body to be fixed to a bicycle frame and a second body carrying idle wheels for a bicycle chain, said second body being displaceable with respect to said first body into a plurality of positions to cause selective engagement of the chain with a plurality of sprockets carried by the hub of the rear wheel of the bicycle, to provide the various gear ratios of the change device,
- a d.c. electric motor to drive the movement of said second body of the derailleur,
- electronic control means for controlling said electric motor,
- manually controlled actuating means connected to said electronic control means, to cause actuation of the electric motor in order to engage a desired gear ratio,
- electronic means for detecting the position of said second body of the derailleur and for signalling this position to said control means, in order to enable said electric motor to be automatically deactivated when the desired gear ratio is reached,
- characterized in that said electric motor is mounted onto said first body of the derailleur and has an output shaft connected to said second body through interposition of a screw-and-nut coupling, and
- in that said electronic detecting means includes an encoder directly mounted onto the body of said electric motor and able to detect the angular position of the shaft of this motor and consequently the position of said second body of the derailleur.

In a preferred embodiment, the device according to the invention is also characterized in that said electric motor is provided with a supply battery of a rechargeable type and that said device comprises a dynamo-electric unit for recharging the battery, which is incorporated in one of the idle wheels for the chain.

In the case in which said first body and said second body of the derailleur are connected to each other by a parallelogram linkage, said electric motor is arranged along a diagonal of the parallelogram linkage, with its body pivotally mounted onto one apex of the parallelogram linkage and the screw connected to its output shaft engaged within a nut whose body is pivotally mounted onto the opposite apex of the parallelogram linkage.

In another embodiment, the second body of the derailleur is guided so as to move along a straight line with respect to said first body and said screw connected to the output shaft of the electric motor is engaged within a threaded hole formed through said second body.

Naturally, in the case in which the change device comprises also a front derailleur with associated chain sprockets, the device is further preferably characterized in that it comprises a second electric motor to drive the movement of the front derailleur and manually controlled actuating means which is also connected to said electronic control means to cause actuation of the electric motor associated with the front derailleur, said electric motor being mounted directly onto the front derailleur and being also provided with a corresponding encoder.

Preferably, the battery associated with the electric motor of the front derailleur is the same electric supply battery of the electric motor of the rear derailleur.

According to a further feature, said electronic control means is constituted by a microprocessor unit.

In a preferred embodiment, this microprocessor unit is provided to automatically control, through the electric motor associated with the front derailleur, independently from the actuation of the front derailleur, correction movements of said front derailleur, which render the chain shift on the rear derailleur easier, when the rear derailleur is activated.

Figure 2:
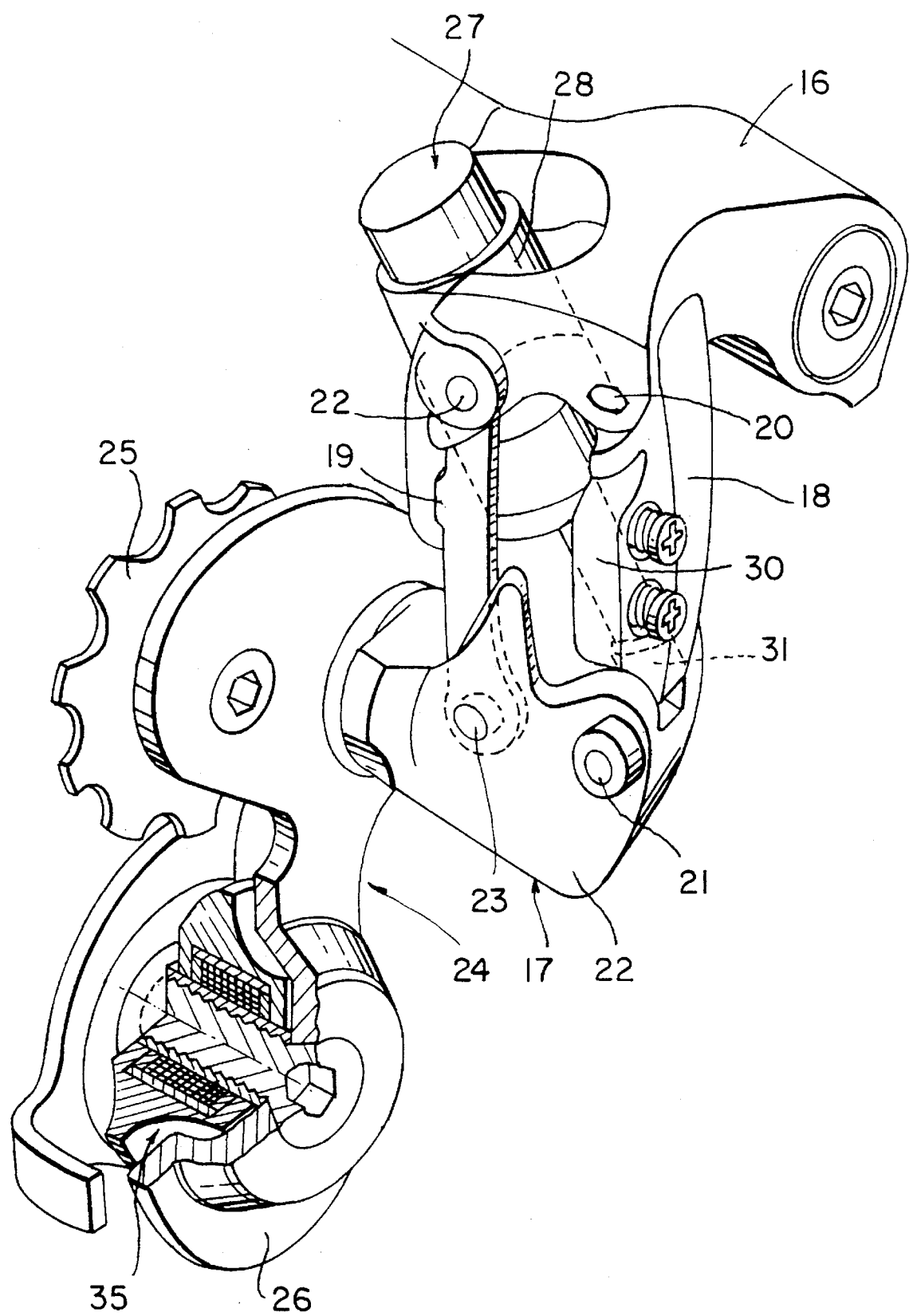
Figure 3:
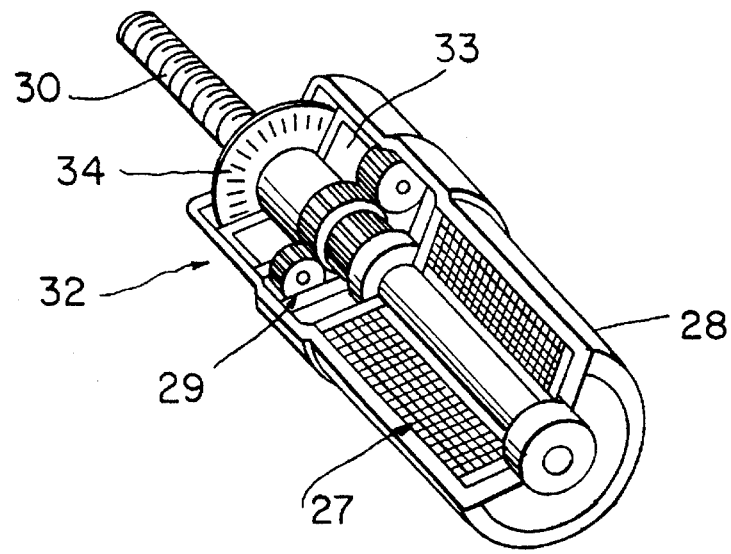
Figure 4:
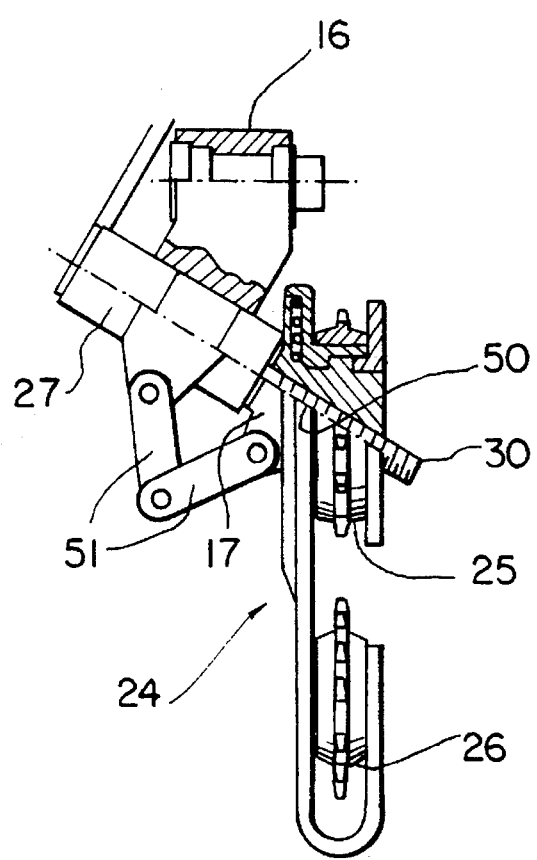

Further features and advantages of the invention will become apparent from the following description with reference to the annexed drawings, given purely by way of non limiting example, in which:

FIG. 1 is a diagrammatic prospective view of a bicycle provided with a device according to the invention, FIG. 2 is a prospective view at an enlarged scale of the rear derailleur forming part of the device according to the invention, FIG. 3 is a diagrammatic perspective and sectional view, at an enlarged scale, of the electric motor with associated encoder forming in part of the device according to the invention, and FIG. 4 is a front view, partially in cross section, of a variant of the derailleur of FIG. 2.

With reference to FIG. 1, a race bicycle is generally designated by 1, essentially comprising a frame 2 comprised in known way of tubular elements defining a support structure 3 for a rear wheel 4 and a fork 5 for a front wheel 6 which is associated with a handle-bar 70 also having a tubular structure.

Frame 2 carries at its lower part a crank axle or pedal assembly 7, of a generally conventional type, for driving the rear wheel 4 through a speed change device according to the invention, generally designated by 8.

The speed change device 8 essentially comprises a rear speed change 9 and a front speed change 10 comprising in a generally known way, the former a plurality of chain sprockets 11 (8 sprockets are shown in the example) having different diameters and coaxial with axis A of rear wheel 4, and the latter a number of chain toothed wheels 12 (2 wheels are shown in the example) having different diameter and coaxial with axis B of the crank axle 7.

The chain sprockets 11 and the chain toothed wheels 12 are selectively engageable by a transmission endless chain 13, to provide the different speed ratios available by the speed change unit 8 through displacement of a rear derailleur 14 of the rear speed change 9 and the front derailleur 15 of the front speed change 10; respectively.

The rear derailleur 14 is shown at an enlarged scale in FIG. 2. It comprises a first body 16 which can be fixed to the frame of the bicycle and a second body 17 connected to the first body 16 (in the case of the example illustrated in FIG. 2) by a parallelogram linkage comprising two arms 18, 19 whose ends are articulated at 20, 21 and 22, 23 to the two bodies 16, 17. The second body 17 carries, in a way known per se; a rocker arm 24 carrying idle wheels 25, 26 for the chain.

By 27 there is designated an electric motor and reduction unit fed at 6 volts d.c. and directly incorporated within derailleur 14 to drive the movement of the rocker arm 24 through the various positions of engagement of chain 3 with sprockets 11.

The motor and reduction unit 27 comprises a body 28 which is shown at an enlarged scale and in cross section in FIG. 3. The body or casing 28 itself not only encloses motor 27, but also an epicyclic reduction gear 29 connected to the output shaft of the electric motor 27. The output of the epicyclic reduction gear 29 drives rotation of a screw 30.

As shown in FIG. 2, body 28 of the motor and reduction unit is pivotally supported by body 16 of the derailleur around axis 22, whereas screw 30 engages a nut 31 whose body is pivotally mounted around axis 21 on body 17 of the derailleur. In this manner, the motor and reduction unit is arranged along a diagonal of the parallelogram linkage and the rotation of the motor causes a corresponding rotation of screw 30 through the epicyclic reduction gear 29, so that nut 31 is moved along the screw causing lengthening or shortening of the distance between axes 21, 22 of the parallelogram linkage.

As shown in FIG. 3, casing 28 of the motor and reduction unit also encloses an encoder of any known type, generally designated by reference number 32, comprising an optical or magnetic reader 33 cooperating in a way known per se with disk 34 carried by disk screw 30. The details of construction of encoder 32 are not described herein since, as already indicated, this device may be of any known type.

The electric supply to the motor and reduction unit 27 is provided by a battery 30' (FIG. 1) advantageously housed in one of the tubes of frame 2 or, alternatively, within one of the arms of handle bar 70, or within the housing of a microprocessor control unit 40 (only partially visible in FIG. 1) which is fixed for example to the frame of the bicycle in the area of the crank axle and provides control for the electric motor 27 on the basis of signals originated by two manually controlled actuating levers 43, 44 associated with a brake lever 41 (FIG. 1). The microprocessor unit 40 (which may be also housed within the brake lever unit) is also connected to the encoder 32 which detects the angular position of screw 30 and consequently of the rear derailleur, so as to stop the electric motor when a desired transmission ratio is reached, this ratio being chosen by manually actuating levers 43, 44 (which are actuated for chain shifting to higher or lower ratios respectively). The connections between said electric components are made by cables (not shown in the drawings) advantageously housed within the tubes of frame 2.

According to one aspect of the invention, the battery 30' is of a rechargeable type and the rear derailleur includes a dynamo-electric unit 35, of a type known per se, which is mounted within the idle wheel 26 of rocker arm 24.

According to a possible alternative, the manually controlled actuating means may be comprised, instead of the levers 43, 44, of a control keyboard.

The principles described above with reference to the rear derailleur are naturally applicable also to the .front derailleur 15. In this case also derailleur 15 is provided with an associated actuating electric motor, with associated reduction gear and encoder, said further electric motor being also controlled by the microprocessor unit 40 and being fed by the same battery 30.

According to a further preferred feature, the microprocessor unit 40 is provided for driving the front derailleur 15 also when only the rear derailleur is actuated, in order to obtain correction movements of said front derailleur which do not cause the chain to derail on the front toothed wheels, but only serve to avoid interference between the chain and the front derailleur frame sides when the chain is derailed on the rear sprockets.

FIG. 4, finally, shows a variant of the rear derailleur in which said second body has a through threaded hole 50 engaged by screw 30 and is further connected to the first body by two levers 51 pivoted to each other in a compass-like fashion, so that an actuation of the motor causes a displacement of the second body with respect to the first body according to a linear path.

Naturally, while the principle of the invention remains the same, the details of construction and the embodiments may widely vary with respect to what has been described and illustrated purely by way of example, without departing from the scope of the present invention.

I claim:

1. Speed change device for bicycles, comprising:

at least one rear derailleur having a first body to be fixed to a bicycle frame and a second body carrying idle wheels for a bicycle chain, said second body being displaceable with respect to said first body into a plurality of positions to cause selective engagement of the chain with a plurality of sprockets carried by the hub of the rear wheel of the bicycle, to provide the various gear ratios of the change device, a d.c. electric motor to control the movement of said second body of the derailleur, electronic control means for controlling said electric motor, manually controlled actuation means connected to said electronic control means, to cause actuation of the electric motor in order to engage a desired gear ratio, electronic means to detect the position of said second body of the derailleur and for signalling this position to said control means to enable said electric motor to be automatically deactivated when the desired gear ratio is reached, wherein said electric motor is mounted on said first body of the derailleur and has an output shaft connected to said second body by interposition of a screw-and-nut coupling and wherein said detecting electronic means is comprised of an encoder directly mounted onto the body of said electric motor and adapted to detect the angular position of the shaft of said electric motor and consequently the position of said second body of the derailleur.

2. Change device according to claim 1, wherein said electric motor is provided with a supply battery of a rechargeable type and that said device comprises a dynamo-electric unit for recharging said battery which is incorporated in one of said idle wheels.

3. Change device according to claim 1, wherein said first body and said second body are connected to each other by a parallelogram linkage, wherein said electric motor is arranged along a diagonal of the parallelogram linkage.

4. Change device according to claim 1, wherein said second body is guided so that it may move along a linear path with respect to said first body wherein the output shaft of said electric motor is connected to a screw which engages a through threaded hole formed within said second body.

5. Change device according to claim 1, wherein said device further comprises a front derailleur with associated chain toothed wheels coaxial to each other, having different diameters and selectively engageable by said endless chain, said front derailleur being displaceable into a plurality of positions each corresponding to the engagement of the chain with a respective toothed wheel, a second electric motor for driving movement of the front derailleur, manually controlled actuating means for actuating said second electric motor, wherein said second electric motor is directly mounted onto the front derailleur and is provided with an associated encoder.

6. Change device according to claim 5, wherein said second electric motor is fed by said electric battery supplying the electric motor associated with the rear derailleur.

7. Change device according to claim 6, wherein a same microprocessor unit provides for the control of the two electric motor and is provided to drive, independently from the actuation of the front derailleur, slight correction movements of the latter when the rear derailleur is actuated.

\* \* \* \* \*